United States Patent
Wang et al.

(10) Patent No.: US 10,342,046 B2
(45) Date of Patent: Jul. 2, 2019

(54) SENDING REQUEST MESSAGE BASED ON RECEIVED ANNOUCEMENTS

(71) Applicant: Intel Corporation, Santa Clara, CA (US)

(72) Inventors: Ping Wang, Santa Clara, CA (US); Shu-Ping Yeh, New Taipei (TW); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 15/392,775

(22) Filed: Dec. 28, 2016

(65) Prior Publication Data

US 2018/0184455 A1    Jun. 28, 2018

(51) Int. Cl.
*H04W 74/08* (2009.01)
*H04B 17/345* (2015.01)
*H04W 76/10* (2018.01)
*H04W 64/00* (2009.01)
H04W 84/12 (2009.01)

(52) U.S. Cl.
CPC ...... *H04W 74/0816* (2013.01); *H04B 17/345* (2015.01); *H04W 64/003* (2013.01); *H04W 76/10* (2018.02); H04W 84/12 (2013.01)

(58) Field of Classification Search
CPC ............ H04W 74/0816; H04W 76/10; H04W 64/003; H04W 84/12; H04B 17/345
See application file for complete search history.

(56) References Cited

U.S. PATENT DOCUMENTS

| | | | | |
|---|---|---|---|---|
| 2007/0248089 A1* | 10/2007 | Redi | ...................... | H04L 45/00 370/392 |
| 2012/0263091 A1* | 10/2012 | Kim | ..................... | H04B 7/0452 370/312 |
| 2015/0172038 A1* | 6/2015 | Jiang | ...................... | H04L 5/143 370/280 |
| 2016/0037484 A1* | 2/2016 | Kwon | ................. | H04W 72/005 370/312 |
| 2016/0255620 A1* | 9/2016 | Li | ......................... | H04L 5/0023 370/329 |

* cited by examiner

*Primary Examiner* — Omar J Ghowrwal
(74) *Attorney, Agent, or Firm* — Eversheds Sutherland (US) LLP

(57) ABSTRACT

This disclosure describes systems, methods, and devices related to an sending request message based on received announcements system. A device may identify a transmitter announcement received from a first device. The device may identify a receiver announcement received from a second device. The device may cause to send a request message to transmit to a third device based at least in part on a predetermined threshold associated with the receiver announcement. The device may identify an indication that the third device is able to receive one or more packets from the device. The device may cause to send the one or more packets to the third device.

10 Claims, 9 Drawing Sheets

SENDING REQUEST MESSAGE BASED ON RECEIVED ANNOUCEMENTS

TECHNICAL FIELD

This disclosure generally relates to systems, methods, and devices for wireless communications and, more particularly, sending request message based on received announcements.

BACKGROUND

Wireless devices are becoming widely prevalent and are increasingly requesting access to wireless channels. Wireless networks such as a wireless local area network (WLAN) or a cellular network may link two or more devices using distributed wireless access methods. However, interference between the links may ensue in dense deployment resulting in failed transmissions.

DETAILED DESCRIPTION

Figure 1:
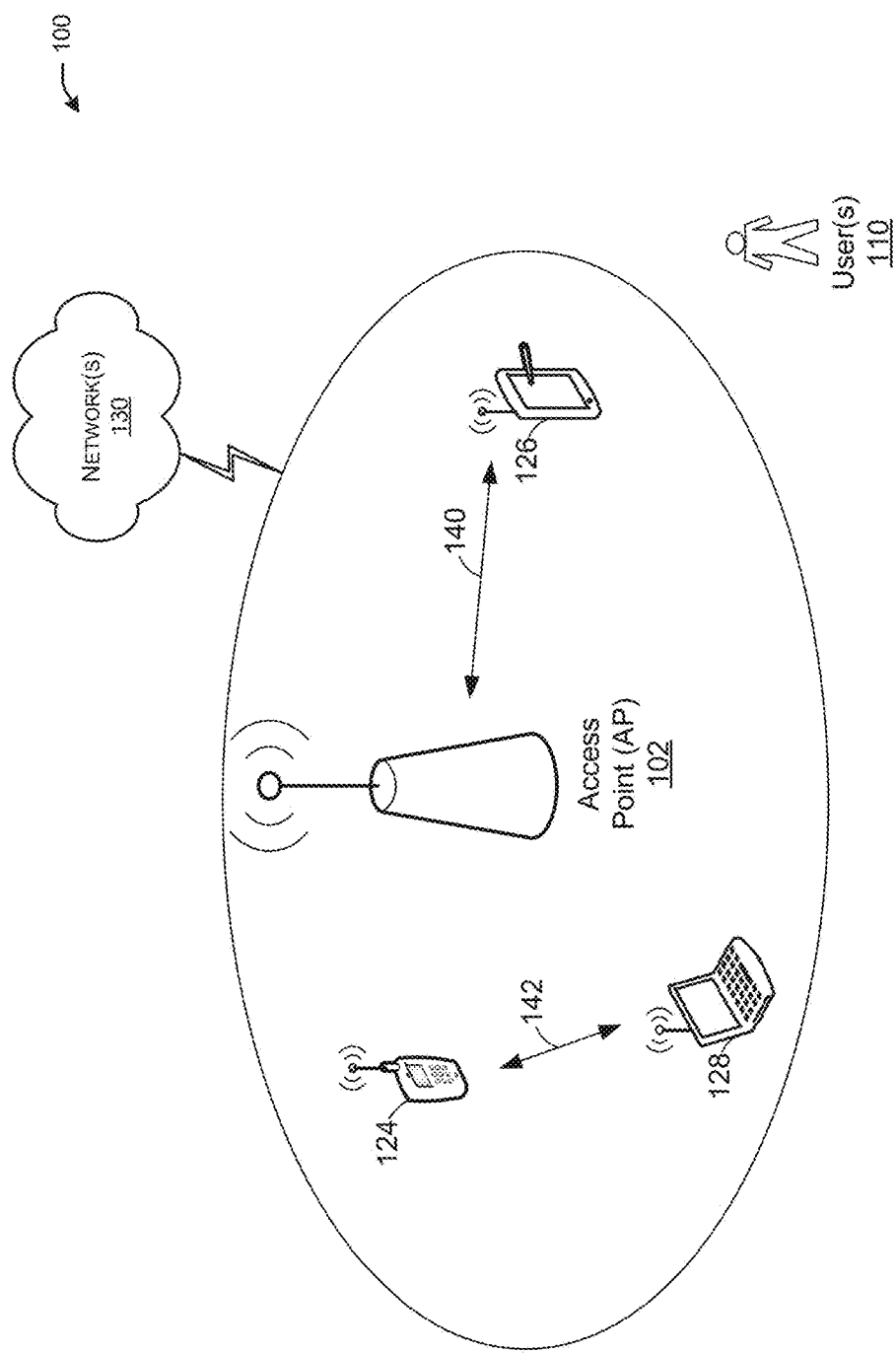
FIG. 1 depicts a diagram illustrating an example network environment of an illustrative exposed node and hidden node alleviation system, in accordance with one or more example embodiments of the present disclosure.

Example embodiments described herein provide certain systems, methods, and devices for providing signaling information to WI-FI devices in various WI-FI networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The access to unlicensed bands, including WLAN and an LTE License Assisted Access (LAA) system, is typically preceded by a "listen before talk" (LBT) or "clear channel assessment" (CCA) mechanism, through which the transmitter determines the presence of ongoing transmissions in the same channel. Specifically, an access point (AP) or a station (STA) (prior to transmitting buffered data) senses the channel, and transmits only if the channel is adjudged to be idle. That is, the detected energy on the channel is below the CCA or LBT threshold. As mandated by the current IEEE 802.11 standard, the energy detected (or sensed) in the channel is compared with a predefined CCA threshold (e.g., signal detect threshold is −82 dBm and energy threshold is −62 dBm for 20 MHz OFDM transmission). This method creates a radio frequency energy based guard zone around each transmitter and hence prevents any other transmitter in this region from reusing the medium. However, in a dense deployment, the above mechanism leads to the classic "exposed node" problem and "hidden node" problem An exposed node problem refers to a situation where an "exposed" transmitter is prevented from sending packets to other nodes because of sensing a neighboring transmitter. A hidden node problem refers to a situation where certain transmissions cause substantial interference to the "hidden" receiver which is not detected by the transmitter.

Example embodiments of the present disclosure relate to systems, methods, and devices for exposed node and hidden node alleviation.

In one embodiment, an exposed node and hidden node alleviation system may facilitate the use of the full-duplex capability of devices to alleviate the exposed node and hidden node problem occurring in WLAN and LAA systems with no or minimal medium access control (MAC) overhead addition.

In one embodiment, an exposed node and hidden node alleviation system may determine that when a transmitting device starts transmitting its packet, the full-duplex capable nodes, including the receiving device and the victim nodes, when they hear and/or receive a packet, can simultaneously transmit an announcement to create a radio frequency (RF) energy based guard zone around themselves and hence avoid collisions from unwanted transmissions. A victim node refers to a node in the interference range of the transmitting device. In addition, depending on the physical layer (PHY) implementations, the transmitting device itself may transmit the announcement together with its data transmission to create an RF energy based guard zone around itself as well. Such announcements may be designed to be decodable by the nodes in the neighborhood and may transmit if not impacting the data reception of ongoing receptions.

In one embodiment, an exposed node and hidden node alleviation system may introduce two schemes to alleviate the exposed and/or hidden node by utilizing a full-duplex capability of the nodes depending on whether the transmitting device sends an announcement (together with data) or not.

In one embodiment, an exposed node and hidden node alleviation system may implement a first scheme using sender and receiver announcements, if the transmitting device sends announcements together with data.

In another embodiment, an exposed node and hidden node alleviation system may implement a second scheme with victim and receiver announcements, if the transmitting device does not send announcements with data.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment of an illustrative exposed node and hidden node alleviation system, in accordance with one or more example embodiments of the present disclosure. Wireless network 100 may include one or more user devices 120 (e.g., user devices 124, 126, and 128) and one or more access points (APs) 102, which may communicate in accordance with 3GPP and/or IEEE 802.11 communication standards. The user device(s) 120 may be mobile devices that are non-stationary (e.g., not having fixed locations) or may be stationary devices. The access point (AP) 102 as used herein may be a fixed station and may be also referred to as a master station, an access node, a base station, an evolved node B (eNodeB), or some other similar terminology known in the 3GPP and/or IEEE 802.11 communication standards.

Figure 7:
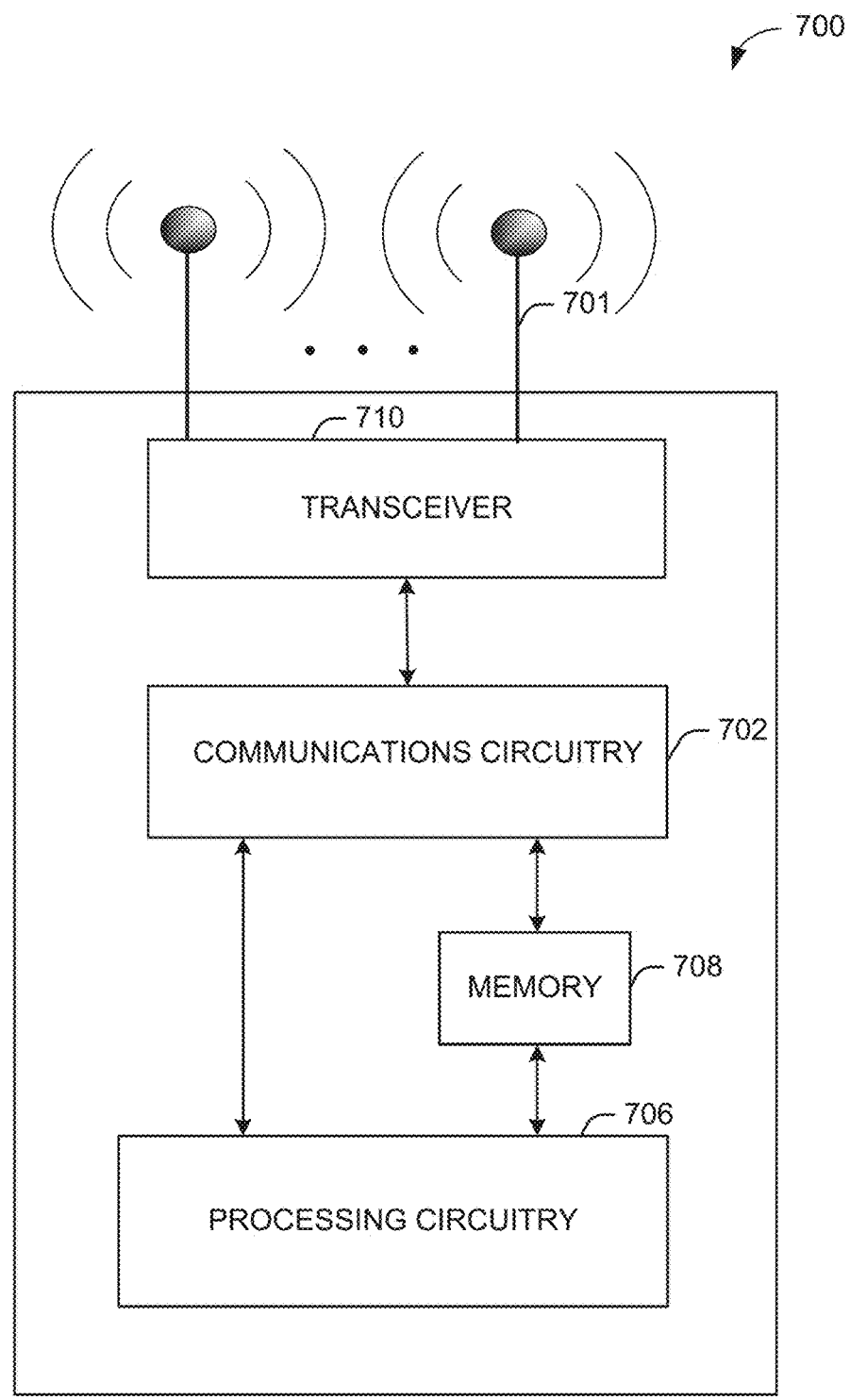
FIG. 7 illustrates a functional diagram of an example communication station that may be suitable for use as a user device, in accordance with one or more example embodiments of the present disclosure.
Figure 8:
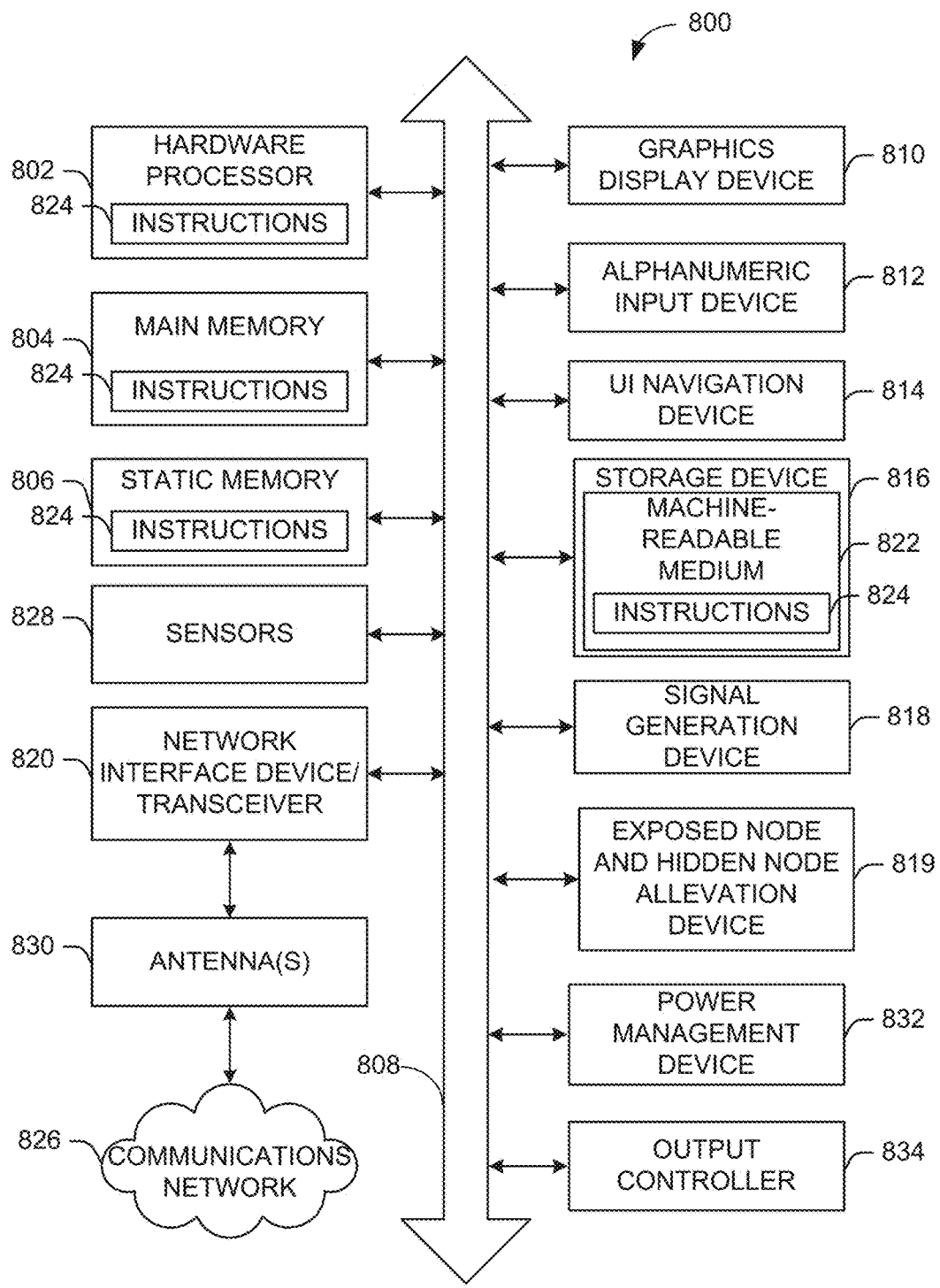
FIG. 8 illustrates a block diagram of an example machine upon which any of one or more techniques (e.g., methods) may be performed, in accordance with one or more example embodiments of the present disclosure.

In some embodiments, the user devices 120 and AP 102 may include one or more computer systems similar to that of the functional diagram of FIG. 7 and/or the example machine/system of FIG. 8.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an AP, an eNodeB, a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a BLU-RAY disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 wirelessly or wired. The user device(s) 120 may also communicate peer-to-peer or directly with each other with or without the AP 102. Any of the communications networks 130 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include WI-FI antennas, Institute of Electrical and Electronics Engineers (IEEE) 802.11 and/or 3GPP family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more GSM, LTE, WI-FI, and/or WI-FI DIRECT protocols, as standardized by the 3GPP and IEEE 802.11 standards. In certain example embodiments, the radio component, in cooperation with the communications antennas, may be configured to communicate via 800 MHz, 2.4 GHz channels, 5 GHz channels, or 60 GHZ channels or any other channels. In some embodiments, non-WI-FI, GSM, or LTE protocols may be used for communications between devices, such as BLUETOOTH, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP 102 may communicate in a downlink direction, and the user devices 120 may communicate with the AP 102 in an uplink direction by sending frames in either direction. The user devices 120 may also communicate peer-to-peer or directly with each other with or without the AP 102. The data frames may be preceded by one or more preambles that may be part of one or more headers. These preambles may be used to allow a device (e.g., the AP 102 and/or the user devices 120) to detect a new incoming data frame from another device. A preamble may be a signal used in network communications to synchronize transmission timing between two or more devices (e.g., between the APs and the user devices).

In one embodiment, and with reference to FIG. 1, a transmitter node (e.g., AP 102) may be in communication (e.g., communication 140) with a receiver node (e.g., user device 126). Nodes that may be in the transmission range of the AP 102 may not be allowed to transmit to other devices. An exposed node problem and a hidden node problem may exist depending the location of a candidate transmitter node or a candidate receiver node. A candidate transmitter node is a node that wishes to transmit to a candidate receiver node, while a communication is ongoing between two neighboring devices. For example, during the communication 140 between the AP 102 and the user device 126, the user device 124 may wish to communicate (e.g., communication 142) with the user device 128. However, if the user device 124 detects the communication 140, it may refrain from accessing the communication channel to establish communication 142 with the user device 128. In addition, the user device 128 only receives data, it may not cause interference with device 126. However, interference from AP 102 may impact the data reception of the user device 128.

In one embodiment, an exposed node and hidden node alleviation system may facilitate two schemes for alleviating the exposed and hidden node problem using the full-duplex capability. Depending on implementation constraints, one of the two schemes may be selected. The exposed node and hidden node alleviation system may provide for receiver node announcements, transmitter node announcements, and/or victim node announcements. Both schemes require the receiver nodes to send an announcement to have a guard zone around the receiver.

In one embodiment, an exposed node and hidden node mediation system may implement a first scheme that requires a transmitter node to send an announcement, but does not require the victim nodes to send announcements. The second scheme may require certain victim nodes to send announcements using their full-duplex capability in order not to impact ongoing transmissions. In those scenarios, there may be no need for the transmitter to send an announcement. Both schemes may use one additional handshaking between the candidate transmitter node and the candidate receiver node and/or rely on the historical transmission information to choose the candidate receiver. In the first scheme, the candidate receiver node relies on the transmitter node announcement to make the decision of its eligibility to receive packets from the candidate transmitter node. In the second scheme, the candidate receiver node relies on the receiver announcements and data transmission it detects in order to communicate with the candidate transmitter node. It is understood that the above descriptions are for purposes of illustration and are not meant to be limiting.

Figure 2:
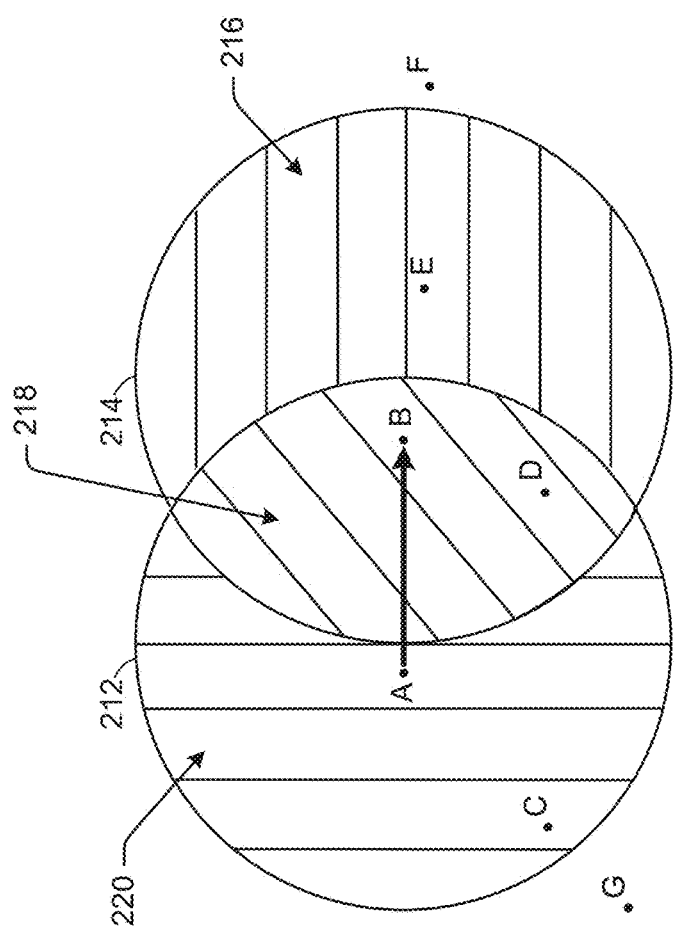
FIG. 2 depicts an illustrative schematic diagram of exposed and hidden nodes, in accordance with one or more example embodiments of the present disclosure.

FIG. 2 depicts an illustrative schematic diagram of exposed and hidden nodes, in accordance with one or more example embodiments of the present disclosure.

Referring to FIG. 2, there is shown a node A that is transmitting to a node B, where area 212 is node A's transmission range IntfZone(A), and area 214 is node B's reception range IntfZone(B). It should be noted that the ranges are for illustration purposes, and the actual region may differ depending on specific signals being transmitted and their respective transmission power and/or type and the wireless channel environment. The area 218 is the intersection of areas 212 and 214, which includes nodes that are common to both areas 212 and 214. The area 220 includes the nodes that are found in area 212 without the nodes that are found in area 218 and may be referred to as [IntfZone(A)-IntfZone(A∩B)]. The area 216 includes the nodes that are found in area 214 without the nodes that are found in area 218 and may be referred to as [IntfZone(B)-IntfZone(A∩B)]. The nodes within area 216 (e.g., node E) may be hidden nodes, where they cannot sense A but their transmission would impact B's reception. The nodes within area 220 (e.g., node C) may be exposed nodes, where they can sense A's transmission so they are not able to transmit based on the original CSMA mechanism, even if their transmission does not impact B's reception.

To alleviate the hidden node problem, an RTS/CTS message exchange is introduced in 802.11, which creates a guard zone around the transmitter (TX) and the receiver (RX). Ideally RTS/CTS would prevent nodes within areas 212 and 214, referred to as [IntfZone(A)∪IntfZone(B)], to transmit while node A is transmitting to node B. However, this additional messaging increases the overhead and reduces the efficiency of the medium access control layer (e.g., MAC). It is understood that the above descriptions are for purposes of illustration and are not meant to be limiting.

Figure 3:
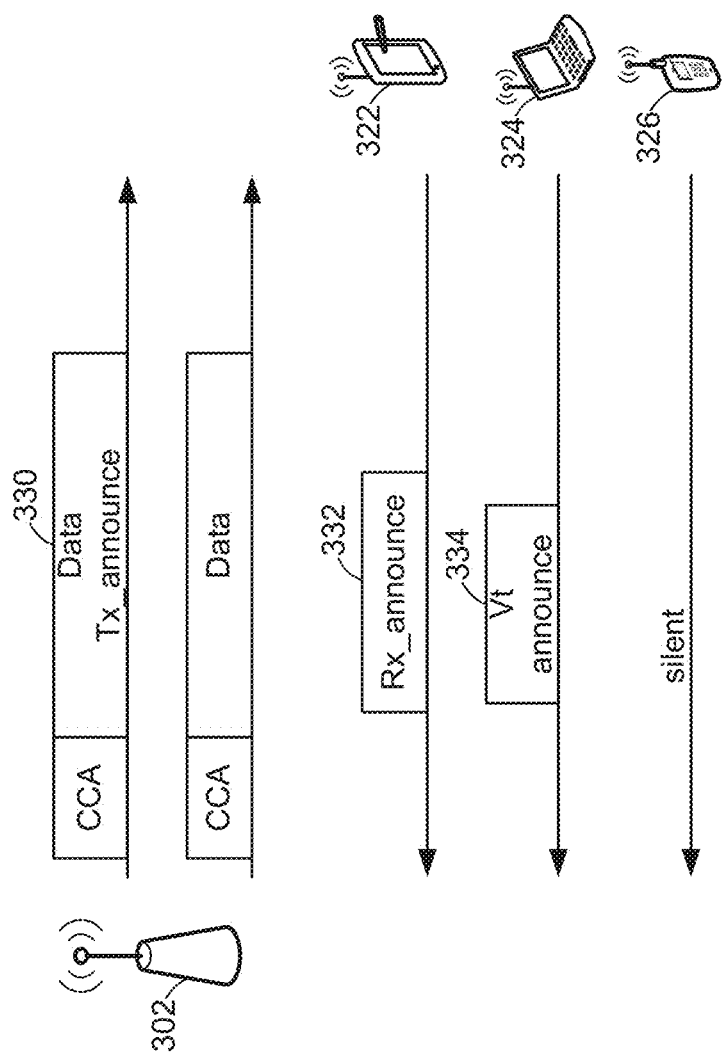
FIG. 3 depicts an illustrative schematic diagram of an exposed node and hidden node alleviation system, in accordance with one or more example embodiments of the present disclosure.

FIG. 3 depicts an illustrative schematic diagram of an exposed node and hidden node alleviation system, in accordance with one or more example embodiments of the present disclosure.

Referring to FIG. 3, there are shown two possible transmissions from a transmitter node or device 302 and a receiver node or device 322, where there are two victim nodes or devices 324 and 326. An exposed node and hidden node alleviation system may use the full-duplex capability of the nodes (e.g., the devices 322, 324, 326 and the transmitter device 302) to send one or more announcement frames while listening or receiving, such that any candidate transmitter node (e.g., an exposed node transmitter such as node C in FIG. 2) can decide if it can transmit to its candidate receiver (e.g., node D in FIG. 2) or not, based on the announcement information it receives.

More specifically, the nodes in the transmitter's range can be divided into three categories: transmitter (Tx), receiver (Rx), and victim (Vt). The receiver nodes and the victim nodes can transmit announcements when they receive and/or listen to transmissions within the range because of their full-duplex capability. The transmitter device, on the other hand, could transmit an announcement too when it transmits data (e.g., frame 330), if the network is capable of sending the announcement together with data on the physical layer. That is, the transmitter (e.g., the transmitter device 302) may send out a "Tx_announce" if it is capable of doing so while transmitting to frame 330. The receiver (e.g., device 322) can send an "Rx_announce" packet 332 upon reception of the data and decoding of the MAC header from the transmitter device 302. A victim node (e.g., the victim device 324) may send a "Vt_announce" packet 334 upon hearing the data from the transmitter (e.g., the transmitter device 302). In one example, a candidate transmitter node (e.g., an exposed node transmitter such as node C in FIG. 2), may listen to the announcements and may detect the ongoing transmissions and then decide if it can perform a concurrent transmission or not. In addition, for efficiency purposes, it is not necessary to utilize all of the announcements from every node. Depending on whether the transmitter sends the announcement with data or not, two schemes may be used to efficiently utilize one or more subsets of the announcements.

In one embodiment, an exposed node and hidden node alleviation system may facilitate two schemes. One scheme may work with transmitter and receiver announcements without the need for victim announcements. The second scheme may work with victim and receiver announcements without the need for transmitter announcements. In addition, for the second scheme requiring victim transmission, a subset of victim nodes may be selected to send an announcement to reduce the possibility of interfering with the ongoing reception. It is understood that the above descriptions are for purposes of illustration and are not meant to be limiting.

Figure 4:
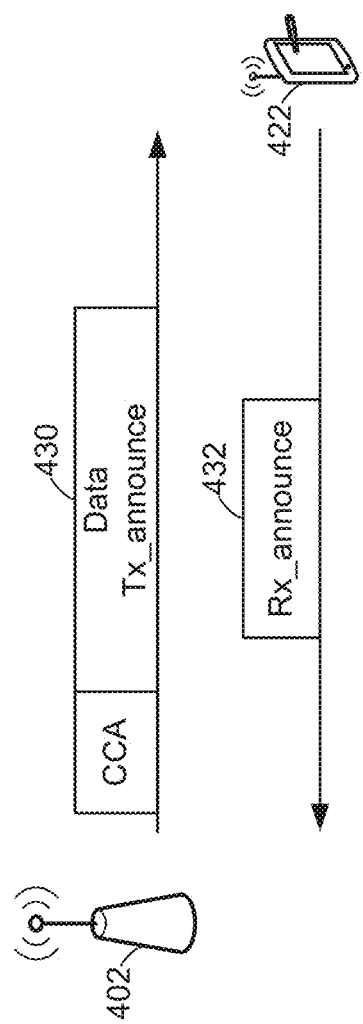
FIG. 4 depicts an illustrative schematic diagram of an exposed node and hidden node alleviation system using transmitter and receiver node announcements, in accordance with one or more example embodiments of the present disclosure.

FIG. 4 depicts an illustrative schematic diagram of an exposed node and hidden node alleviation system using transmitter and receiver node announcements, in accordance with one or more example embodiments of the present disclosure.

Referring to FIG. 4, there is shown a transmitter device 402 transmitting data (e.g., frame 430) to a receiver device 422. An exposed node and hidden node alleviation system may enable a concurrent transmission from a node X to a node Y, when a transmission between a node A to a node B transmission is ongoing. The exposed node and hidden node alleviation system may determine that node X's transmission does not affect node B's reception. That is, X is not a hidden node. A hidden node problem refers to a situation where certain transmissions cause substantial interference to the "hidden" receiver which is not detected by the transmitter. The exposed node and hidden node alleviation system may determine that node X can transmit even if X detects A's transmission. That is, X is an exposed node and is eligible to transmit. An exposed node problem refers to a situation where an "exposed" transmitter is prevented from sending packets to other nodes because of sensing a neighboring transmitter. Further, the exposed node and hidden node alleviation system may determine that node Y's reception is not impacted by node A's transmission (with tolerable co-channel interference).

In one embodiment, the exposed node and hidden node alleviation system may use the full-duplex capability of the nodes to allow an exposed node's concurrent transmission while protecting the receiver from collision with the hidden node.

FIG. 4 shows the scheme with the transmitter and receiver announcements. This scheme assumes the announcement can be sent together with data from the same node (e.g., the transmitter device 402); that is, the announcement is highly decodable by other nodes and the performance of the data reception is only negligibly impacted by the transmitter's announcement transmission overlapping with the data transmission (e.g., frame 430). It should be understood that the design of the announcement may be realized by methods where the announcements may be aggregated with or sent on top of the data with proper design such that the announcements can be detectable by neighboring nodes, and the data transmission can be decoded even with aggregation with the announcements.

In one embodiment, the exposed node and hidden node alleviation system may facilitate the transmitter device 402 to send a "Tx_announce" together with the data after it is granted the channel. The receiver device 422, upon receiving the data packet and after decoding the MAC header, may send an "Rx_announce" (e.g., frame 432) over the air. The transmitter and receiver announcements may be orthogonally multiplexed (e.g., time, frequency, or code multiplexing) with each other and decodable when aggregated with the data transmission. The transmitter and/or the receiver announcements may be mapped in the frequency domain to a different subband and/or subcarrier in order to introduce a separation during detection. For example, transmitter announcements from two transmitter nodes are mapped to different subcarriers in the Tx subband, and the receiver announcement(s) from the receiver node(s) are mapped to different subcarriers in the Rx subband. Further, the specific subcarrier to map may be designed in such a way to minimize mapping collision, and it can be a reflection of the individual MAC-ID of the transmitter and/or the receiver nodes.

In one embodiment, with the transmitter and receiver announcement, as shown in FIG. 2, nodes in the area 212 may hear the announcement from the transmitter node A, and the nodes in the area 214 could hear the announcement from the receiver node B. For a node X to transmit concurrently with A->B, they may not be within the area 214, because node X may interfere with node B's reception. That is, only X∈[All-IntfZone(B)] may be allowed to transmit concurrently with A->B. For the candidate receiver, Y, to receive concurrently with A->B, it may not be within the area 212; otherwise, it is also a victim of A's transmission. That is, only Y∈[All-IntfZone(A)] may be allowed to transmit concurrently with A->B. For instance, with the existing transmission of A->B, node C in FIG. 2 is an exposed node, and it may be able to transmit to G (e.g., C->G) because it is not within area 214. Node E is a hidden node and may not be able to transmit to node F (e.g., E->F) because it may collide with A->B since it is in area 214.

In other words, an exposed and hidden node alleviation system may facilitate a candidate transmitter node (e.g., node X) to listen to the announcements in its neighborhood, and if it does not hear any Rx announcements or the signal level of the Rx announcements it hears is below a certain threshold (e.g., X∈[All-IntfZone(B)]), the candidate transmitter node may be eligible to transmit because it is unlikely to cause interference to the existing receiver nodes since it did not detect any Rx announcements.

Once the candidate transmitter has traffic to transmit and it is eligible to transmit, it may perform one or more actions in order to transmit its traffic. For example, in one embodiment, if node X has traffic to be sent to node A, it may designate node A as a candidate receiver node, where node A has full-duplex capability and is able to cancel the self-interference of its own transmission A->B. If node X decides to choose another node to send traffic to, X may send a "request to transmit" message to the other candidate receiver nodes. The candidate receiver nodes may check the Tx announcements they may detect and/or the total interference level they currently observe. If a candidate receiver does not detect any Tx announcements, or the signal level of the Tx announcements it detects is below a certain threshold (i.e., Y∈[All-IntfZone(A)]), or the total interference level they currently observe is below a certain threshold, the candidate receiver node (e.g., node Y) may be eligible to receive and may reply to the candidate transmitter with an "ok to receive" message. The threshold setting can be determined to reflect the signal-to-interference ratio between the candidate transmitter and the existing receiver (e.g., node B in FIG. 2). If the candidate transmitter does not get a reply, it may choose not to transmit the packet.

In another embodiment, the candidate transmitter could check its historical table and pick a receiver to send data to. The historical table may be a table storing the historical success and failure transmission information regarding the link between the candidate transmitter and the candidate receiver when A->B transmission is ongoing. This option does not need additional hand-shaking, and it may be used in relatively quasi-static networks where the historical information reflects relatively well on the new link situation. It is understood that the above descriptions are for purposes of illustration and are not meant to be limiting.

Figure 5:
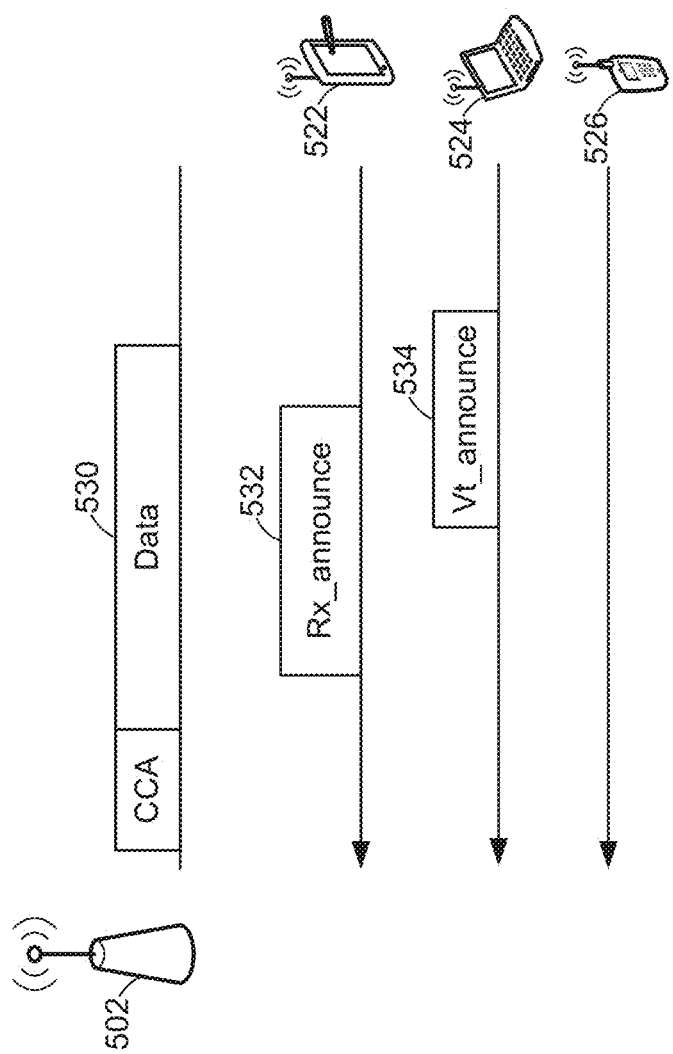
FIG. 5 depicts an illustrative schematic diagram of an exposed node and hidden node alleviation system using victim and receiver node announcements, in accordance with one or more example embodiments of the present disclosure.

FIG. 5 depicts an illustrative schematic diagram of an exposed node and hidden node alleviation system using victim and receiver node announcements, in accordance with one or more example embodiments of the present disclosure.

Referring to FIG. 5, there is shown a transmitter node 502 transmitting data (e.g., frame 530) to a receiver node 522, where there are two victim nodes 524 and 526. FIG. 5 shows a scheme with victim and receiver announcements without the need for transmitter announcements.

In this scheme, since the transmitter node 502 does not need announcement with the data transmission, the victim nodes 524 and 526 and the receiver node 522 may be responsible for sending announcements. However, the announcements from the victim nodes 524 and 526 may impact the performance of the ongoing reception between the transmitter node 502 and the receiver node 522 if the victim nodes 524 and 526 are substantially close to the receiver node 522. In this case, an exposed node and hidden node alleviation system may choose a subset of victim nodes to provide the announcements.

In one embodiment, the receiver node 522, upon receiving the data packet and after decoding the MAC header, may send an "Rx_announce" (e.g., frame 532). And at least one victim node (e.g., victim node 524) may send out a "Vt_announce" (e.g., frame 534) using its full-duplex capability if this victim node meets the following criteria: (1) it hears the transmission from the transmitter node; and (2) it does not hear any "Rx_announce" or the "Rx_announce" message it hears is below a certain threshold.

In the scenario where a node X can transmit even if the node X senses a node A's transmission to a node B (e.g., A->B); that is node X is an exposed node and is eligible to transmit, using the victim node announcements may minimally impact the ongoing reception by node B. The threshold may reflect a certain level of the link quality (e.g., the signal-to-interference ratio for the transmissions from the victim nodes to node B). Thus if the "Rx_announce" (e.g., frame 532) detected by the victim node 526 is above the threshold, the victim node is likely to be close to the receiver node 522 (such as node D in FIG. 2) and may cause interference to the ongoing reception if the victim node 526 transmits a "Vt_announce" frame. In that case, the victim node 526 may not transmit "Vt_announce" in this case.

Similar to the embodiments of FIG. 4, the announcements may be designed to be orthogonally multiplexed (e.g., TDM/FDM/CDM) with each other and decodable in the presence of data transmission in order to provide the diversity of the announcements.

In one embodiment, an exposed and hidden node alleviation system may facilitate a candidate transmitter node X to listen to the announcements from the victim nodes and the existing receiver node, and execute one or more of the following options:

In option (1), the candidate transmitter node X may check if it detects any receiver node announcements. If it does not detect any announcements or a receiver node announcement's signal power is below a certain threshold (X∈[All-IntfZone(B)], the candidate transmitter node X maybe eligible to transmit.

In option (2), if the candidate transmitter node X determines it has data traffic to the ongoing transmitter node (e.g., node A in FIG. 2), it may start to transmit to node A, since the new transmission from the candidate transmitter node X to node A (X->A) will not be impacted by A->B transmission. This is because node A has full-duplex capability which enables node A to cancel the interference caused by its own transmission (A->B).

In option (3), if the candidate transmitter node X does not have data traffic to node A, it may check if it detects any victim node announcements, and if the candidate receiver node Y is not in the list of victim announcements it detected or the corresponding signal level of the announcement is below a certain threshold (Y∈[All-(A-IntfZone(A∩B)]), the candidate receiver node may possibly be eligible to receive a transmission.

In option (4a), the candidate transmitter node X may send a "request to transmit" message to the candidate receiver node Y. The candidate receiver node Y may be determined to be satisfying the condition Y∈[All-(A-IntfZone(A∩B)], and option (3), it may be determined if Y∈IntfZone(A∩B)) (e.g., area 218 of FIG. 2) is satisfied. In that case, when the candidate receiver node Y receives the "request to transmit" message and if it does not hear any "Rx_announce," the node Y may reply to the candidate transmitter with an "ok to receive" message. Otherwise, if node Y does not receive the "request to transmit" message, or it receives the "request to transmit" message yet it also hears "Rx_announce" as well as some ongoing data transmission (Y∈IntfZone(A∩B) (e.g., area 218 of FIG. 2), then node Y may not be not eligible to receive a transmission. In that case, node Y may not respond to the candidate transmitter node X.

In option (4b), the candidate transmitter node X may optionally check its historical table and choose a receiver node that may have passed the check of option (3) in order to send data to. The historical table may be a table storing the historical success/failure transmission information regarding the link candidate transmitter->candidate receiver when the A->B transmission is ongoing.

For option (4a), it may be possible that the request/reply hand-shaking message may collide with the existing A->B transmissions if the candidate receiver node is in the interference range of an existing transmitter node (e.g., Y∈IntfZone(A∩B). So if the candidate transmitter node does not get a reply, it may choose not to transmit the packet, or it may rely on option (4b) to decide further if it transmits or not. It is understood that the above descriptions are for purposes of illustration and are not meant to be limiting.

Figure 6A:
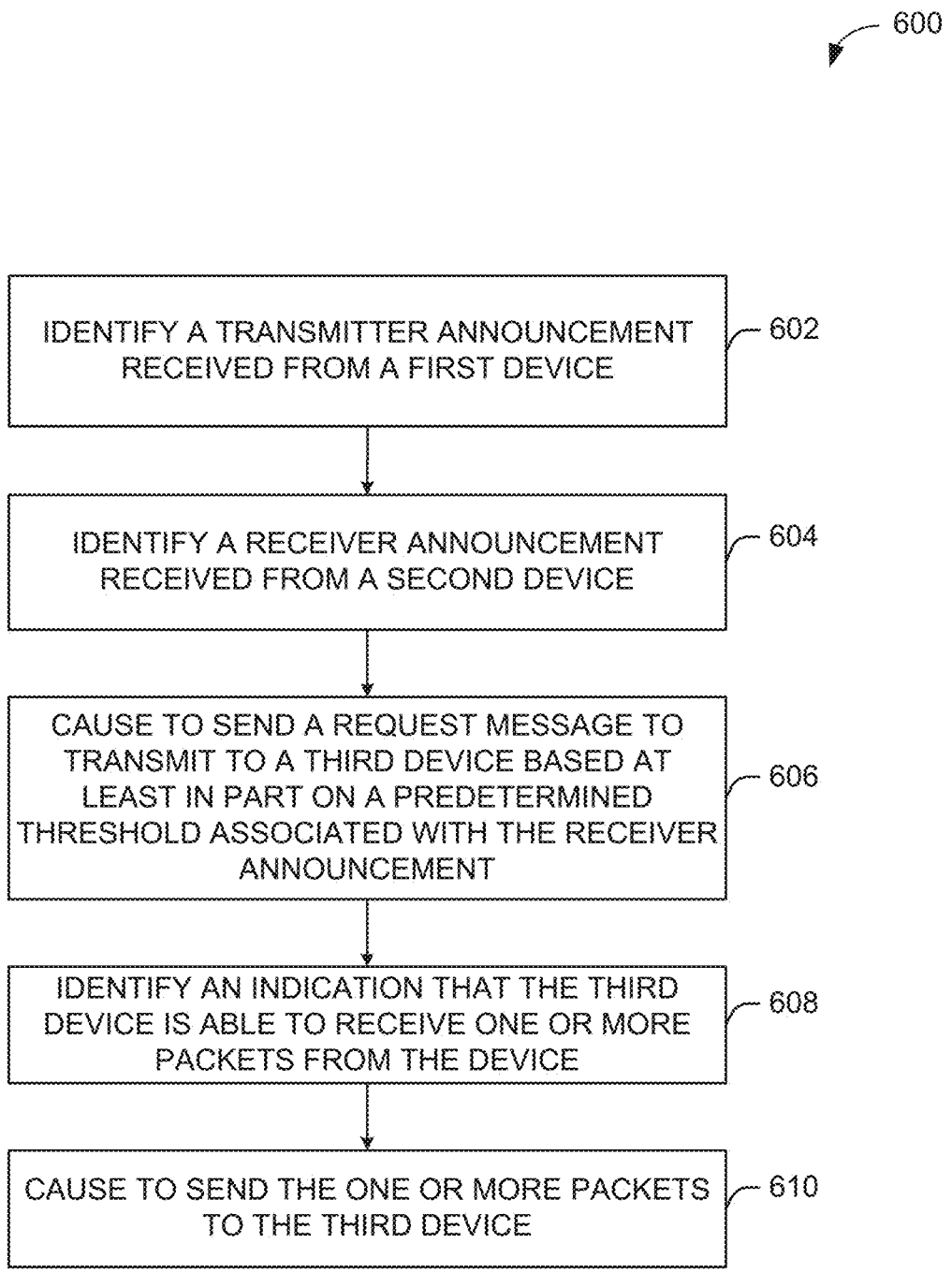
FIG. 6A depicts a flow diagram of an illustrative process for an exposed node and hidden node alleviation system with transmitter and receiver announcements, in accordance with one or more example embodiments of the present disclosure.

FIG. 6A illustrates a flow diagram of an illustrative process 600 for an exposed node and hidden node alleviation system with transmitter and receiver announcements, in accordance with one or more example embodiments of the present disclosure.

At block 602, a device (e.g., the user device(s) 120 and/or the AP 102 of FIG. 1) may identify a transmitter announcement (e.g., TX_announce) received from another device (e.g., the user device(s) 120 and/or the AP 102 of FIG. 1). The device may be a candidate transmitter node wishing to transmit to a candidate receiver node. The transmitter announcement may assume that it can be sent together with data from the same node (e.g., a transmitter node). Also, the transmitter announcement may be decoded by other nodes in order to determine the current transmission between a transmitter node and a receiver node. The device may be able to determine whether it can transmit concurrently with a current transmission between the transmitter node and the receiver node based at least in part on the transmitter announcement and/or the receiver announcement. The transmitter announcement may be transmitted from the transmitter node, and the receiver announcement may be transmitted from the receiver node in the current transmission.

At block 604, the device may identify a receiver announcement received from the receiver node that is involved in the current transmission with the transmitter node. The transmitter node may send the "Tx_announce" together with the data packets after it is granted the channel. The receiver node, upon receiving the data packets and after decoding the MAC header, may send an "Rx_announce" over the air. The transmitter and receiver announcements may be orthogonally multiplexed (e.g., time, frequency, or code multiplexing) with each other and decodable when aggregated with the data transmission. The transmitter and/or receiver announcements may be mapped in the frequency domain to a different subband and/or subcarrier in order to introduce a separation during detection. For example, transmitter announcements from two transmitter nodes are mapped to different subcarriers in the Tx subband, and the receiver announcement(s) from the receiver node(s) are mapped to different subcarriers in the Rx subband. Further, the specific subcarrier to map may be designed in such a way to minimize mapping collision, and it can be a reflection of the individual MAC-ID of the transmitter and/or the receiver nodes. The candidate transmitter node may listen to the announcements in its neighborhood, and if it does not hear any Rx announcements or the signal level of the Rx announcements it hears is below a certain threshold, the candidate transmitter node may be eligible to transmit because it is unlikely to cause interference to the existing receiver nodes since it did not detect any Rx announcements.

At block 606, the device (e.g., a candidate transmitter node) may cause to send a request message to transmit to a candidate receiver node based at least in part on a predetermined threshold associated with the receiver announcement. Once the candidate transmitter has traffic to transmit and it is eligible to transmit, it may perform one or more actions in order to transmit its traffic. For example, the candidate transmitter node may determine if it has traffic to be sent to the transmitter node currently in communication with a receiver node, and it may designate the transmitter node as a candidate receiver node, where the transmitter node has full-duplex capability and is able to cancel the self-interference of its own transmission with the receiver node. If the candidate transmitter node decides to choose another node to send traffic to, the candidate transmitter node may send a "request to transmit" message to the other candidate receivers. The candidate receiver nodes may check the Tx announcements they may detect.

At block 608, the device (e.g., the candidate transmitter node) may identify an indication that the candidate receiver node is able to receive one or more packets from the device. The indication may be in the form of a message that the candidate transmitter node may receive from the candidate receiver node. If the candidate receiver does not detect any Tx announcements, or the signal level of the Tx announcements it detects is below a certain threshold, the candidate receiver node may be eligible to receive and may reply to the candidate transmitter node with an "ok to receive" message. The threshold setting can be determined to reflect the signal-to-interference ratio between the candidate transmitter node and the existing receiver node. If the candidate transmitter node does not get a reply, it may choose not to transmit the packet.

At block 610, the device may cause to send the one or more packets to the candidate receiver node. In the case where the candidate transmitter node receives a reply from the candidate receiver node, the candidate transmitter node may then send its packets to the candidate receiver node. In some embodiments, the candidate transmitter node may check its historical table and may pick a receiver node to send data to. The historical table may be a table storing the historical success and failure transmission information regarding the link between the candidate transmitter node and the candidate receiver node when a current transmission is ongoing between a transmitter node and a receiver node. It is understood that the above descriptions are for purposes of illustration and are not meant to be limiting.

Figure 6B:
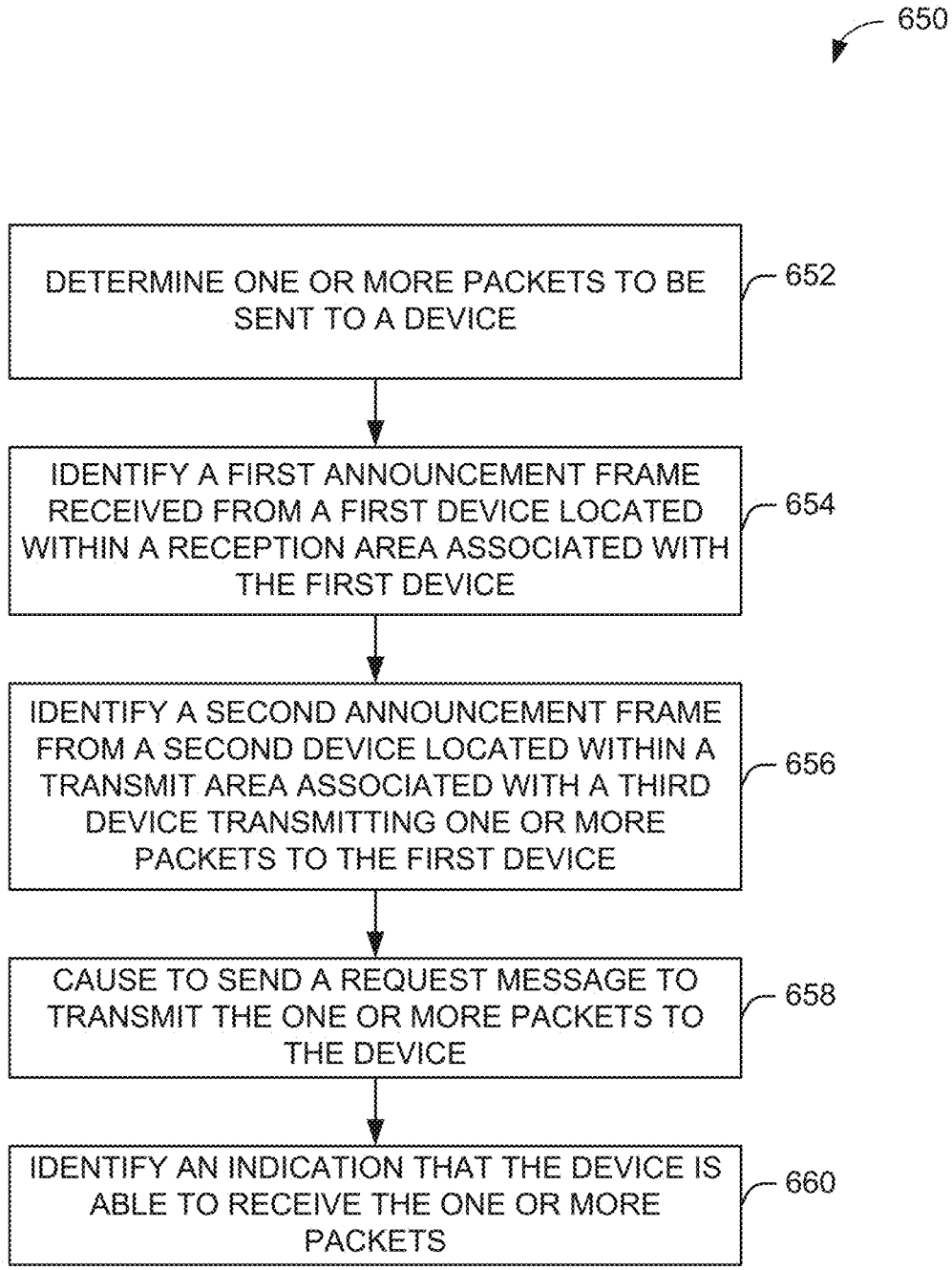
FIG. 6B depicts a flow diagram of an illustrative process for an exposed and hidden node alleviation system with victim and receiver announcements, in accordance with one or more example embodiments of the present disclosure.

FIG. 6B illustrates a flow diagram of an illustrative process 650 for an exposed node and hidden node alleviation system with victim and receiver announcements, in accordance with one or more example embodiments of the present disclosure.

At block 652, a device (e.g., the user device(s) 120 and/or the AP 102 of FIG. 1) may determine one or more packets to be sent to another device (e.g., the user device(s) 120 and/or the AP 102 of FIG. 1). For example, the device may be a candidate transmitter node wishing to transmit to a candidate receiver node while a current communication is ongoing between a transmitter node and a receiver node. The candidate transmitter node may have one or more packets it may need to send to the candidate receiver node.

At block 654, the device may identify a first announcement frame received from a first device located within a reception area associated with the first device. For example, a candidate transmitter node may determine if a receiver announcement is received from the receiver node. Also, the candidate transmitter node may determine whether the receiver announcement's signal power is below a certain threshold before it may be considered eligible to transmit to the candidate receiver node.

At block 656, a device may identify a second announcement frame from a second device located within a transmit area associated with a third device transmitting one or more packets to the first device. For example, the candidate transmitter node may listen to the announcements from the victim nodes and/or from the receiver node. Victim nodes are nodes that are in the interference range of the transmitter node. The candidate transmitter node may determine if it detected an announcement from a victim node (e.g., Vt_announce).

At block 658, the device may cause to send a request message to transmit the one or more packets to the device. For example, the candidate transmitter node may send a message (e.g., request a transmit message) to the candidate receiver node indicating that it wishes to send one or more packets to the candidate receiver node. The candidate receiver node may then determine if it has detected a receiver announcement from the receiver node currently in communication with the transmitter node.

At block 660, the device may identify an indication that the device is able to receive the one or more packets. For example, in the case where the candidate receiver node does not hear any receiver announcements, the candidate receiver node may then reply to the candidate transmitter node with a message indicating that it is able to receive the one or more packets from the candidate transmitter node. It is understood that the above descriptions are for purposes of illustration and are not meant to be limiting.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or media access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2, 3, 4, 5, 6A and 6B.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an exposed node and a hidden node alleviation device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The exposed node and hidden node alleviation device 819 may carry Out or perform any of the operations and processes (e.g., the processes 600 and 650) described and shown above.

The exposed node and a hidden node alleviation device 819 may facilitate the use of the full-duplex capability of the devices to alleviate the exposed node and hidden node problem occurring in WLAN and LAA systems with no or minimal medium access control (MAC) overhead addition.

The exposed node and hidden node alleviation device 819 may determine that when a transmitting device starts transmitting its packet, the full-duplex capable nodes, including the receiving device and victim nodes, when they hear and/or receive a packet, can simultaneously transmit an announcement to create a radio frequency (RF) energy based guard zone around themselves and hence avoid collisions from unwanted transmissions. A victim node refers to a node in the interference range of the transmitting device. In addition, depending on the physical layer (PHY) implementations, the transmitting device itself may transmit or announcement together with its data transmission to create an RF energy based guard zone around itself as well. Such announcements may be designed to be decodable by the nodes in the neighborhood and may transmit if not impacting the data reception of ongoing receptions.

The exposed node and hidden node alleviation device 819 may introduce two schemes to alleviate the exposed and/or hidden node by utilizing a full-duplex capability of the nodes depending on whether the transmitting device sends an announcement (together with data) or not.

The exposed node and hidden node alleviation device 819 may implement a first scheme using the sender and receiver announcements, if the transmitting device sends the announcement together with data.

The exposed node and hidden node alleviation device 819 may implement a second scheme with the victim and receiver announcements, if the transmitting device does not send the announcement with data.

It is understood that the above are only a subset of what the exposed node and hidden node alleviation device 819 may be configured to perform and that other functions included throughout this disclosure may also be performed by the exposed node and hidden node alleviation device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), WI-FI, WI-MAX, ZIGBEE, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a non-transitory computer-readable medium storing computer-executable instructions which, when executed by a processor, cause the processor to perform operations. The operations may include identifying a transmitter announcement received from a first device. The operations may include identifying a receiver announcement received from a second device. The operations may include causing to send a request message to transmit to a third device based at least in part on a predetermined threshold associated with the receiver announcement. The operations may include identifying an indication that the third device is able to receive one or more packets from the device. The operations may include causing to send the one or more packets to the third device.

According to example embodiments of the disclosure, there may be a device. The device may include memory and processing circuitry configured to identify a transmitter announcement received from a first device. The memory and processing circuitry may be further configured to identify a receiver announcement received from a second device. The memory and processing circuitry may be further configured to cause to send a request message to transmit to a third device based at least in part on a predetermined threshold associated with the receiver announcement. The memory and processing circuitry may be further configured to identify an indication that the third device is able to receive one or more packets from the device. The memory and processing circuitry may be further configured to cause to send the one or more packets to the third device.

The implementations may include one or more of the following features. The memory and the processing circuitry are further configured to determine the receiver announcement is below a predetermined threshold, wherein the predetermine threshold is associated with a power level of the receiver announcement. The device and the second device have full-duplex capability. The transmitter announcement is aggregated with one or more data packets sent from the first device to the second device. The device is within a transmission area associated with the first device, wherein the transmission area contains one or more devices that can detect transmissions from the first device. The receiver announcement is sent to one or more devices that are within a reception area associated with the second device. The memory and the processing circuitry are further configured to select a receiving device from a table may include one or more transmission information associated with the device. The memory and the processing circuitry are further configured to determine the transmitter announcement is mapped to a first transmit subcarrier of a transmit subband. The memory and the processing circuitry are further configured to determine the receiver announcement is mapped to a first receive subcarrier of a receipt subband. The device may further include a transceiver configured to transmit and receive wireless signals. The device may further include one or more antennas coupled to the transceiver.

According to example embodiments of the disclosure, there may be a device. The device may include memory and processing circuitry configured to establish a communication with a first device. The memory and processing circuitry may be further configured to identify one or more packets received from the first device. The memory and processing circuitry may be further configured to determine a receiver announcement to be sent to one or more devices. The memory and processing circuitry may be further configured to cause to send the receiver announcement to the one or more devices, wherein the one or more devices are within a reception area.

The implementations may include one or more of the following features. The one or more packets received from the first include a transmitter announcement associated with the first device. The memory and the processing circuitry may be further configured to determine a reception area associated with receiving the one or more packets. The memory and the processing circuitry may be further configured to cause to send the receiver announcement using a full-duplex capability.

The implementations may include one or more of the following features. The operations may further comprise determining the receiver announcement is below a predetermined threshold, wherein the predetermine threshold is associated with a power level of the receiver announcement.

The device and the second device have full-duplex capability. The transmitter announcement is aggregated with one or more data packets sent from the first device to the second device. The device may be within a transmission area associated with the first device, wherein the transmission area contains one or more devices that can detect transmissions from the first device. The receiver announcement may be sent to one or more devices that are within a reception area associated with the second device. The operations may further comprise configuring a receiving device from a table may include one or more transmission information associated with the device. The operations may further comprise determining the transmitter announcement is mapped to a first transmit subcarrier of a transmit subband. The operations may further comprise determining the receiver announcement is mapped to a first receive subcarrier of a receipt subband.

According to example embodiments of the disclosure, there may be a non-transitory computer-readable medium storing computer-executable instructions which, when executed by a processor, cause the processor to perform operations. The operations may include establishing a communication with a first device. The operations may include identifying one or more packets received from the first device. The operations may include determining a receiver announcement to be sent to one or more devices. The operations may include causing to send the receiver announcement to the one or more devices, wherein the one or more devices are within a reception area.

The implementations may include one or more of the following features. The one or more packets received from the first include a transmitter announcement associated with the first device. The operations may further comprise determining a reception area associated with receiving the one or more packets. The operations may further comprise causing to send the receiver announcement using a full-duplex capability.

According to example embodiments of the disclosure, there may include a method. The method may include identifying a transmitter announcement received from a first device. The method may include identifying a receiver announcement received from a second device. The method may include causing to send a request message to transmit to a third device based at least in part on a predetermined threshold associated with the receiver announcement. The method may include identifying an indication that the third device is able to receive one or more packets from the device. The method may include causing to send the one or more packets to the third device.

The implementations may include one or more of the following features. The method may further include determining the receiver announcement is below a predetermined threshold, wherein the predetermine threshold is associated with a power level of the receiver announcement. The device and the second device have full-duplex capability. The transmitter announcement is aggregated with one or more data packets sent from the first device to the second device. The device is within a transmission area associated with the first device, wherein the transmission area contains one or more devices that can detect transmissions from the first device. The receiver announcement is sent to one or more devices that are within a reception area associated with the second device. The method may further include configuring a receiving device from a table may include one or more transmission information associated with the device. The method may further include determining the transmitter announcement is mapped to a first transmit subcarrier of a transmit subband. The method may further include determining the receiver announcement is mapped to a first receive subcarrier of a receipt subband.

According to example embodiments of the disclosure, there may include a method. The method may include establishing a communication with a first device. The method may include identifying one or more packets received from the first device. The method may include determining a receiver announcement to be sent to one or more devices. The method may include causing to send the receiver announcement to the one or more devices, wherein the one or more devices are within a reception area. The one or more packets received from the first include a transmitter announcement associated with the first device.

The implementations may include one or more of the following features. The method may further include determining a reception area associated with receiving the one or more packets. The method may further include causing to send the receiver announcement using a full-duplex capability.

In example embodiments of the disclosure, there may be an apparatus. The apparatus may include means for identifying a transmitter announcement received from a first device. The apparatus may include means for identifying a receiver announcement received from a second device. The apparatus may include means for causing to send a request message to transmit to a third device based at least in part on a predetermined threshold associated with the receiver announcement. The apparatus may include means for identifying an indication that the third device is able to receive one or more packets from the device. The apparatus may include means for causing to send the one or more packets to the third device.

The implementations may include one or more of the following features. The apparatus may further include means for determining the receiver announcement is below a predetermined threshold, wherein the predetermine threshold is associated with a power level of the receiver announcement. The device and the second device have full-duplex capability. The transmitter announcement is aggregated with one or more data packets sent from the first device to the second device. The device is within a transmission area associated with the first device, wherein the transmission area contains one or more devices that can detect transmissions from the first device. The receiver announcement is sent to one or more devices that are within a reception area associated with the second device. The apparatus may further include means for configuring a receiving device from a table may include one or more transmission information associated with the device. The apparatus may further include means for determining the transmitter announcement is mapped to a first transmit subcarrier of a transmit subband. The apparatus may further include means for determining the receiver announcement is mapped to a first receive subcarrier of a receipt subband.

In example embodiments of the disclosure, there may be an apparatus. The apparatus may include means for establishing a communication with a first device. The apparatus may include means for identifying one or more packets received from the first device. The apparatus may include means for determining a receiver announcement to be sent to one or more devices. The apparatus may include means for causing to send the receiver announcement to the one or more devices, wherein the one or more devices are within a reception area.

The implementations may include one or more of the following features. The one or more packets received from the first include a transmitter announcement associated with the first device. The apparatus may further include means for determining a reception area associated with receiving the one or more packets. The apparatus may further include means for causing to send the receiver announcement using a full-duplex capability.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry, configured to:
    identify a transmitter announcement received from a first device;
    identify a receiver announcement received from a second device;
    determine the receiver announcement is below a predetermined threshold, wherein the predetermined threshold is associated with a power level of the receiver announcement;
    cause to send a request message to transmit to a third device based at least in part on a predetermined threshold associated with the receiver announcement;
    identify an indication that the third device is able to receive one or more packets from the device; and
    cause to send the one or more packets to the third device.

2. The device of claim 1, wherein the device and the second device have full-duplex capability.

3. The device of claim 1, wherein the transmitter announcement is aggregated with one or more data packets sent from the first device to the second device.

4. The device of claim 1, wherein the device is within a transmission area associated with the first device, wherein the transmission area contains one or more devices that can detect transmissions from the first device.

5. The device of claim 1, wherein the receiver announcement is sent to one or more devices that are within a reception area associated with the second device.

6. The device of claim 1, wherein the memory and the processing circuitry are further configured to select a receiving device from a table comprising one or more transmission information associated with the device.

7. The device of claim 1, wherein the memory and the processing circuitry are further configured to determine the transmitter announcement is mapped to a first transmit subcarrier of a transmit subband.

8. The device of claim 1, wherein the memory and the processing circuitry are further configured to determine the receiver announcement is mapped to a first receive subcarrier of a receipt subband.

9. The device of claim 1, further comprising a transceiver configured to transmit and receive wireless signals.

10. The device of claim 9, further comprising one or more antennas coupled to the transceiver.

* * * * *